United States Patent
Wallace et al.

(10) Patent No.: US 12,091,258 B2
(45) Date of Patent: Sep. 17, 2024

(54) EMBEDDED INDUCTIVE ANTENNA RIP SENSORS USING PRINTING TECHNOLOGIES

(71) Applicant: Continental AG, Hannover (DE)

(72) Inventors: Jack Bruce Wallace, Powell, OH (US); Janosch Kneer, Freiburg (DE); Juerg Schleuniger, Hartheim Feldkirch (DE); Sebastian Seibold, Hannoversch Muenden (DE); Andrey Minkin, Adelebsen (DE); Christel Bäuerle-Müller, Hedemuenden (DE); Stavros Podias, Goettingen (DE)

(73) Assignee: ContiTech Deutschland GmbH, Hannover (DE)

( * ) Notice: Subject to any disclaimer, the term of this patent is extended or adjusted under 35 U.S.C. 154(b) by 114 days.

(21) Appl. No.: 17/813,047

(22) Filed: Jul. 18, 2022

(65) Prior Publication Data
US 2024/0017933 A1   Jan. 18, 2024

(51) Int. Cl.
| | |
|---|---|
| *B65G 43/02* | (2006.01) |
| *B65G 15/30* | (2006.01) |
| *B65G 43/06* | (2006.01) |
| *H01Q 1/22* | (2006.01) |
| *H01Q 7/00* | (2006.01) |
| *H04B 5/73* | (2024.01) |

(52) U.S. Cl.
CPC .............. *B65G 43/02* (2013.01); *B65G 15/30* (2013.01); *H01Q 7/00* (2013.01); *H04B 5/73* (2024.01); *B65G 43/06* (2013.01); *B65G 2203/0275* (2013.01); *B65G 2203/043* (2013.01); *H01Q 1/22* (2013.01)

(58) Field of Classification Search
CPC ........ B65G 43/02; B65G 43/06; B65G 15/30; B65G 2203/0275; B65G 2203/043; H01Q 7/00; H01Q 1/22; H04B 5/73; G06K 19/07749; G06K 19/077
USPC ...................................................... 198/810.08
See application file for complete search history.

(56) References Cited

U.S. PATENT DOCUMENTS

| | | |
|---|---|---|
| 3,792,459 A | 2/1974 | Snyder |
| 3,834,518 A | 9/1974 | Specht et al. |
| 4,228,513 A | 10/1980 | Doljack |

(Continued)

FOREIGN PATENT DOCUMENTS

| | | | |
|---|---|---|---|
| DE | 4444262 C1 | 4/1996 | |
| WO | WO-2012117160 A1 * | 9/2012 | ............. B65G 43/02 |

OTHER PUBLICATIONS

International Search Report dated Oct. 13, 2023 of International application PCT/EP2023/069956 claiming priority this application.

*Primary Examiner* — Mark A Deuble
(74) *Attorney, Agent, or Firm* — Gregory J. Adams; Richard A. Wolf (57) ABSTRACT

A system for monitoring conveyor belts is disclosed. The system includes a printed inductive antenna loop, a transmitter, a detector, and circuitry. The antenna is printed on and/or installed (inserted) into a conveyor belt. The transmitter is proximate the printed antenna and is configured to generate an electromagnetic field. The detector is configured to measure an induced electric field from the printed inductive antenna loop. The circuitry is configured to detect damage of the conveyor belt based on the measured induced electromagnetic field.

15 Claims, 4 Drawing Sheets

(56) References Cited

U.S. PATENT DOCUMENTS

| | | | |
|---|---|---|---|
| 4,621,727 A | 11/1986 | Strader | |
| 6,032,787 A | 3/2000 | Kellis | |
| 6,264,577 B1 * | 7/2001 | Hutchins | B60C 23/0493 198/810.02 |
| 6,352,149 B1 | 3/2002 | Gartland | |
| 6,715,602 B1 * | 4/2004 | Gartland | B65G 43/02 340/676 |
| 7,740,130 B2 * | 6/2010 | Wallace | B65G 43/02 198/810.02 |
| 8,069,975 B2 | 12/2011 | Wallace | |
| 8,910,777 B2 * | 12/2014 | Minkin | B65G 15/36 198/810.02 |
| 2006/0176236 A1 | 8/2006 | Homolle et al. | |
| 2007/0102264 A1 | 5/2007 | Wallace et al. | |
| 2008/0257692 A1 * | 10/2008 | Wallace | B65G 43/02 198/810.02 |
| 2009/0128290 A1 | 5/2009 | Chopra et al. | |
| 2010/0222920 A1 * | 9/2010 | Andreoli | B65G 43/02 700/230 |

* cited by examiner

EMBEDDED INDUCTIVE ANTENNA RIP SENSORS USING PRINTING TECHNOLOGIES

FIELD

The field to which the disclosure generally relates is rubber and thermoplastic elastomers (TPE) based products, such as conveyor belts, and in particular sensors for monitoring belt and rubber containing products.

BACKGROUND

Conveyor belts are often used to convey material from one location to another. The conveyor belt can be an endless design and loop about a plurality of drives and/or wheels.

It is appreciated that antennas can be embedded into conveyor belts for the purpose of detecting damage to the belt. The antennas are typically oriented to run across the conveyor belt transverse to the longitudinal direction of the belt and the direction of travel of the belt. A transversely aligned transmitter head and receiver head at a specified separation in accordance with the belt width, with a transmitter for generating an electromagnetic field that induces a current in the antenna and a detector for detecting the electrical field generated by the induced current in the antenna are disposed together at a longitudinal position of the conveyor belt system.

Typically, the antennas comprise wire loops that are embedded into the top (carry) cover or bottom (pulley) cover of the conveyor belt. These wire loops have relatively large thickness profiles that require minimum cover thicknesses to be embedded into. Additionally, the wires are much smaller than the longitudinal reinforcing cables which can be damaged during operation and, hence, these wires can also be easily damaged. Given that these wires need to maintain a conductive loop, a break in the loop wire often leads to the loop to be no longer be efficient at coupling the transmitted radio frequency signal across the width of the belt and this can lead to the loop not being detected by the receiving detector.

One or more techniques are needed to provide lower profile antenna loops for conveyor belts.

DETAILED DESCRIPTION

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific data points, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one, and the singular also includes the plural unless otherwise stated.

The terminology and phraseology used herein is for descriptive purposes and should not be construed as limiting in scope. Language such as "including", "comprising", "having", "containing", or "involving", and variations thereof, is intended to be broad and encompass the subject matter listed thereafter, equivalents, and additional subject matter not recited.

Also, as used herein, any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

It is appreciated that inductive sensor loops, referred to as antennas can be used for rip detection in conveyor belts.

These loops typically involve two categories, a non-inverting rectangular loop design and an inverting figure '8' design. The FIG. 8 design has loops to mitigate crosstalk between transmitter and detector components. The loops are spaced along the conveyor belt length and the functionality of the loops are monitored by the detector heads, which monitor the amount of signal that is coupled through the width of the conveyor belt via the inductive antenna loops.

A common issue with the inductive sensor loops is that their functionality is dependent on the transmission of a radio frequency (RF) induced signal through the loop. This signal cannot be coupled across the conveyor's width if there is a break in the wire. This is the key to its functionality, but also a weakness to its functionality. Often the loop wire can be damaged by events other than a longitudinal rip and for this reason the systems can produce what is referred to as nuisance alarms that can cause the conveyance process to come to a stop as the system logic is stopping the belt to limit the damage associated with a damaged antenna.

Attempts to limit these events through the use of duplicate loops in the same antenna through nested designs have not proven to be an acceptable solution as the wires are normally separated by 20-40 mm and the local damage events often damage both wires in the antenna.

Inductive loops typically rely on sensor wires to be embedded in the conveyor covers to form an inductive antenna element that is detected by inductively coupling to an rf detection circuit, often referred to as detectors. These wire based inductive antennas have a defined thickness gauge and this gauge can force the pulley cover to be larger than it would otherwise be for a specific application. This can add cost and/or eliminate use of these sensors in applications due to physical gauge of the antenna.

An issue associated with inductive sensors relates to the inductive antenna's dependence on conducting or coupling of an RF signal. This requires the conductive element to be continuous and capable of carrying the signal being transmitted. As a result, any damage to the wire will negatively affect the performance of the antenna. In loop antennas, this issue sometimes is overcome through the use of nested or redundant loops within the antenna design in an effort to manage the risk associated with these failures. Unfortunately, an event that would damage one of the antenna conductive elements often impacts the adjacent redundant element as it is in close special proximity to the first element.

One or more embodiments are disclosed that utilize a conductive printed circuit as an antenna loop or loops. This printed antenna provides an advantage to the antenna design that is not easily achievable in the designs that utilize conductive wires, as multiple wire connections would increase the cost of the sensor in addition to adding elements to the design that may negatively impact the performance of the loop through its dynamic mechanical cycles that it needs to survive in the application. Not to mention that the mechanical couples of the wires add to the sensor thickness at the intersection points where the wires are connected, regardless of the joining methodology (ferrule tube crimps, welds, solder, etc.). Printed antenna designs can be implemented to improve the ability of the antenna to couple to the rf signal via optimized novel designs that would improve the ability of the passing sensor antenna to couple more effectively to the rf signal being transmitted by the detector circuitry. With this technology, the wire joining methodology that adds to the thickness and is another element prone to failure, can be eliminated. Alternatively, the robustness of the sensor loop could be changed via designed loop layouts to enable multiple conductive paths for the conduction of the induced rf signal within the antenna itself. This allows for an additional level of redundancy within a single antenna design, decreasing the impact of local damage events to the functionality of the antenna circuit.

In a factory, a typical process for using wire-based antenna requires a belt fabrication process to be interrupted to insert the rip antenna into the belt structure that can generate waste in the form of the lost production time associated with the insertion process or in terms of repairing belt defects that may result from an improperly installed rip antenna. Additionally, the current manufacturing process is a multiple step manual manufacturing process onto itself. Using additive manufacturing, i.e. printing technology the addition and refinement of antenna layout tracks does not result in increasing work efforts during production and is meeting cost efficiency demands.

Using a printing process instead of wire can simplify the process and expand the material flexibility associated with the rip antenna substrate material, i.e. release the limitations towards one rubber substrate and/or expand into completely different polymeric materials such as polyvinyl chloride (PVC), poly urethane (PU), thermoplastic elastomer (TPE), polyethylene terephthalate (PET), thermoplastic polyurethane (TPU), Thermoplastic Vulcanisate (TPV), and the like.

As stated above, current inductive antenna technology can be fabricated by hand on a rubber or rubber and fabric backing using conductive material (typically stranded wire) that are laid out into different patterns depending if the loop is a rectangular loop (non-inverting) antenna, figure '8' loop (inverting) antenna or straight resonant antenna. These rip insert antennas are fabricated off-line and installed into the conveyor during fabrication. This process involves actively installing the sensors at fixed locations along the length of the conveyor belt and this process can slow down the belt fabrication process adding time and cost to the belt production.

A printed antenna technique can be used to print the rip antenna design onto any substrate that allows for the processing of the electrically conductive ink to generate the appropriate antenna loop pattern. Furthermore, with a continuous process, the printed inductive sensor loop design could potentially be applied to the belt during processing, unlike the current process that requires the insert to be integrated into the green or un-vulcanized belt manually. Printing technologies can vary in terms of how the pattern is achieved, such that various printing techniques and combinations of techniques can be utilized and not limited example techniques such as 3D printing, ink jet printing, screen printing, rotary printing and the like. It is appreciated that the choice of printing technique can be based on properties and nature of the inductive sensor loop and can also be based on framework aspects such as production space, existing machinery and/or output volume.

Printing machinery configuration includes roll-to-roll, sheet-to-sheet, roll-to-sheet set-ups depending on those framework aspects.

It is also appreciated that lower profile sensors using a printed antenna technique can be installed without the high labor effort associated with a thicker sensor. The potential is that the sensors could be printed in-line with the fabrication process. There is also lower cost of printing an conductive loop. Further, the ability to scale and fabricate more loops in a shorter period of time using this process.

In one suitable example, a printing technique utilizes an ink or paste containing electrically conductive materials (e.g., metal particles such as silver, platinum or copper, conductive metal oxides, conductive polymers, such as PEDOT:PSS, or other non-metal electrically conductive materials e.g. based on Carbon such as Carbon, Graphene or Graphite) that are transferred towards the described substrate materials by printing technologies such as screen printing or rotary printing (flexography or rotogravure) and post-treated by a radiation such as, thermal, electromagnetic or light induced (such as infrared, UV, photo sintering) methods to encounter for proper morphology in terms of electrical conductance and general mechanical properties (such as adhesion and film thickness). Printing step can be singular or performed multiple times consecutively, whereat the post-treatment step may follow consecutively after every print step or after multiple printing steps ("wet-on-wet print"). Care is taken to select the appropriate substrate that will allow for the printing and curing process to be done without generating adhesion or other belt manufacturing issues for roll-to-roll, (sheet-to-sheet) or roll-to-sheet processes for generating the sensor loops. In-line and off-line can be addressed separately.

A thinner sensor loop antenna design would result in the reduction of the min. pulley cover specification, potentially down to the limit the application design requires. This solution allows for a lower gauge profile sensor that can be generated through an inline printing process that will greatly reduce the cost of the application of these sensors in terms of time to manufacture, cost to install and improved quality.

Additionally, the printing of the loop or circuit onto a substrate potentially allows for the quick change of the substrate to match the design of a belt; whereas, currently the wires are embedded into a rubber substrate that is used in all rubber applications and is not easily transferrable to other conveyor applications that use materials such as polyvinyl chloride (PVC), poly urethane (PU), thermoplastic elastomer (TPE), polyethylene terephthalate (PET), thermoplastic polyurethane (TPU), Thermoplastic Vulcanisate (TPV), and the like for conveyor covers.

In addition, the manufacture of the sensor loops (individually or as part of an inline process) has advantages in expanding the use of this material over a wider range of conveyor belt rip monitoring applications and may reduce the cost of producing belts with this technology to a point that it can be offered in more industrial applications that typically look at rip detection technologies as being too costly to apply in their applications.

Furthermore, due to the high freedom of sensor loop design a higher density of sensor loops per area on the belt can be achieved and improve the monitoring process. This higher density allows a better detailed and precise statement about the status of the belt.

Figure 1:
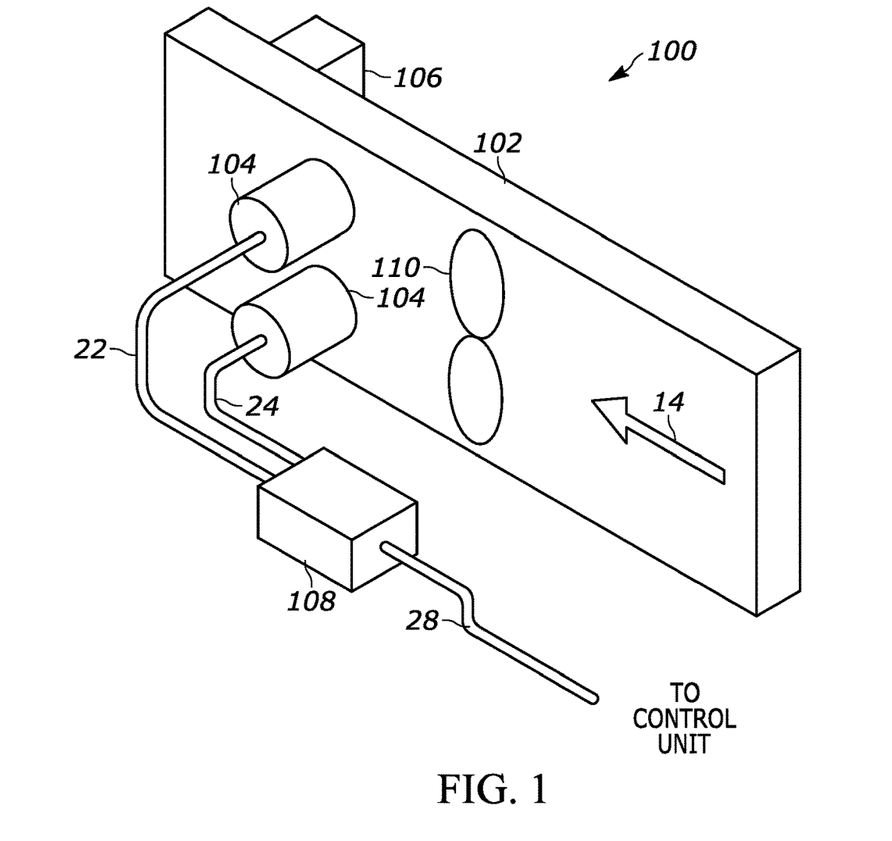
FIG. 1 shows an example of a conveyor belt system 100 configured in an endless loop or belt.

FIG. 1 shows an example of a conveyor belt system 100 configured in an endless loop or belt.

A transmitter array 104 is positioned on one side of a conveyor belt 102 and a detector array is positioned on another side of the belt 102.

The conveyor belt 102 comprises an elastomeric material, including but not limited to, rubber and materials that exhibit elastic and rubber like properties.

Printed inductive antenna loops 110 are embedded in the belt 102 for the purpose of detecting damage to the belt. The printed inductive antenna loops 110 are also referred to as loops or antennas. The antennas 110 are oriented to run across the conveyor belt 102 transverse to the longitudinal direction of the belt and a direction of travel.

It is appreciated that printed antennas and/or inductive loops can be used in textile and steel cord belts.

Additionally, the printing of the circuit/loop 110 onto a substrate (can be elastomeric) potentially allows for the quick change of the substrate to match the design of a belt; whereas, currently the wires are embedded into a rubber substrate that is used in all rubber applications and is not easily transferrable to other conveyor applications that use materials such as polyvinyl chloride (PVC), poly urethane (PU), thermoplastic elastomer (TPE), polyethylene terephthalate (PET), thermoplastic polyurethane (TPU), Thermoplastic Vulcanisate (TPV), and the like for conveyor covers.

The system 100 monitors the conveyor belt 102 and is configured to detect longitudinal rips in a conveyor belt.

The system 100 can determine whether the conveyor belt 102 has sustained damage while the conveyor belt is advancing through the conveyor system 100.

The conveyor belt 102 has a width.

The transmitter 104 is configured to generate an electromagnetic field in the antenna and the detector 106 is configured to detect the electrical field generated or induced in the antenna by the transmitter, which are disposed together at a longitudinal position of the conveyor belt system such that the detector and transmitter are adjacent to each other at a spaced relationship with respect to the transverse direction of the belt.

Control circuitry 108 is coupled to the transmitter 104 and the detector 106. The circuitry 108 is configured to control generation of the electromagnetic field and to process and/or analyze the detected electrical field from the detector 106. The circuitry 108 is configured to detect the presence of damage and/or rips in the conveyor belt 102. The control circuitry 108 can comprise one or more processors, a memory, a network interface and the like.

Figure 2:
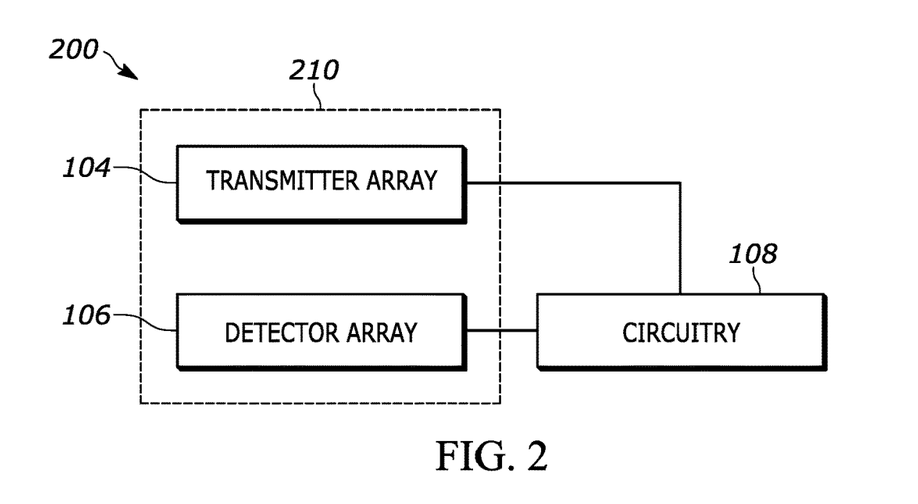
FIG. 2 is a diagram illustrating a schematic view 200 of the conveyor belt system 100 in accordance with one or more embodiments.

FIG. 2 is a diagram illustrating a schematic view 200 of the conveyor belt system 100 in accordance with one or more embodiments.

The transmitter 104 and the detector (or receiver) 106 can be collectively referred to as detector heads 210 and are coupled to the control circuitry 108.

As described above, printed loop antenna(s) are utilized in the system 100 to provide a cost effective and relatively thinner antenna compared to other wire loop techniques.

The antenna(s) or loops can be printed onto a substrate and/or directly onto a belt layer of the belt 102 during processing. This also permits use of thinner pulley cover gauges.

In one example, the printed inductive antenna loop(s) 110 is/are applied to both sides of a substrate or loop substrate.

Choice over roll-to-roll, sheet-to-sheet, roll-to-sheet processes offer the potential to use a larger range of conveyor belt material combination (rubber, PVC, PU, TPE, etc.), In-Line application allows for uninterrupted lower cost continuous production processes and higher quality finished product.

The printed antenna can provide improved sensor designs to improve the functionality of the sensor antenna both in terms of design, topology, dimension, and durability.

Durability can be improved by the use of multiple conductive cells in the loop design which allow for different conductive paths for the electrical signal to pass through in the event that a single or multiple conductive element paths are damaged. Additionally, the continuous printed loop eliminates the need for wire joining and potential failure points at these locations due to flex fatigue of mechanical joint or due to increase thickness of sensor causing accelerated wear of the conveyor belt cover.

Figure 3:
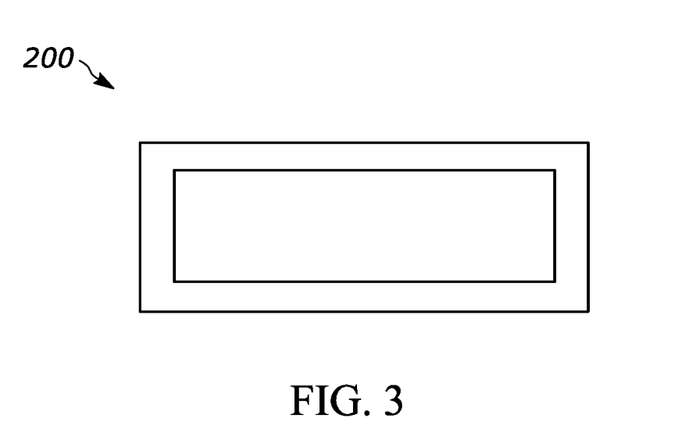
FIG. 3 is a diagram illustrating a printed wire loop or pattern 300 for use as a printed antenna in the system 100 in accordance with one or more embodiments.

FIG. 3 is a diagram illustrating a printed wire loop or pattern 300, 110 for use as a printed antenna in the system 100 in accordance with one or more embodiments.

It is appreciated that other printed wire loops are contemplated.

Figure 4:
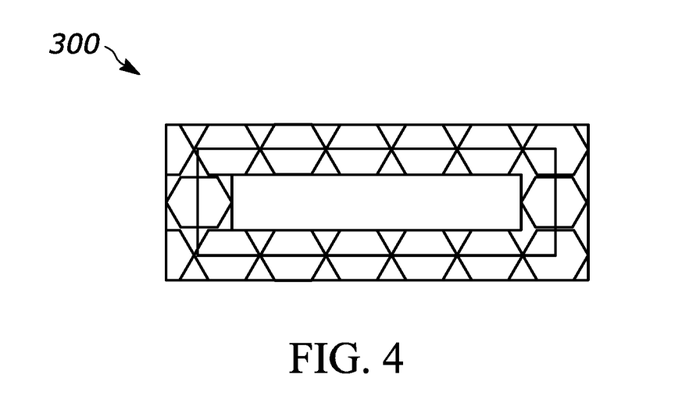
FIG. 4 is a diagram illustrating a printed antenna loop or pattern 400 for use as a printed antenna in the system 100 in accordance with one or more embodiments.

FIG. 4 is a diagram illustrating a printed antenna loop or pattern 400, 110 for use as a printed antenna in the system 100 in accordance with one or more embodiments.

The cell design 400 allows for minor transverse damages to be by-passed through alternate conductive paths.

It is appreciated that other printed wire loops are contemplated.

Figure 5:
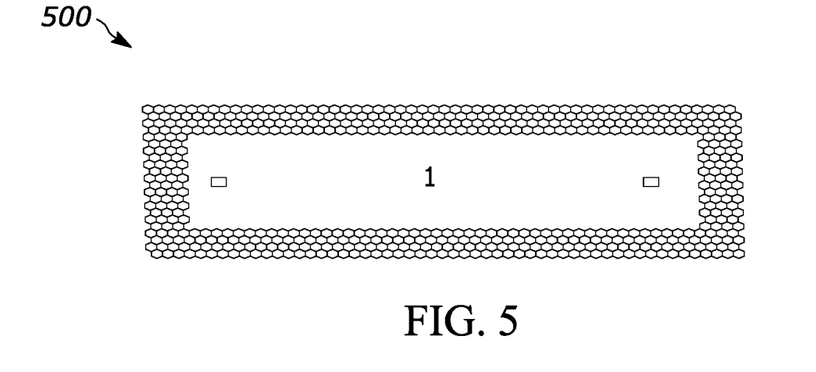
FIG. 5 is a diagram illustrating a printed antenna loop or pattern 500 for use as a printed antenna in the system 100 in accordance with one or more embodiments.

FIG. 5 is a diagram illustrating a printed antenna loop or pattern 500, 110 for use as a printed antenna in the system 100 in accordance with one or more embodiments.

The design of the inductive loop can be varied. For example, the size of the repeating wire matrix can be shaped as a circle and the thickness of the wire can be varied.

It is appreciated that other printed wire loops are contemplated.

Figure 6:
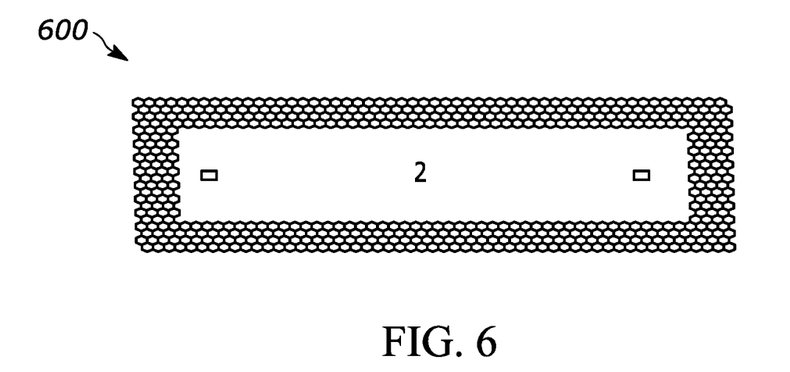
FIG. 6 is a diagram illustrating a printed antenna loop or pattern 600 for use as a printed antenna in the system 100 in accordance with one or more embodiments.

FIG. 6 is a diagram illustrating a printed antenna loop or pattern 600,110 for use as a printed antenna in the system 100 in accordance with one or more embodiments.

The loop 600 has larger circles than the loop 500.

It is appreciated that other printed wire loops are contemplated.

Figure 7:
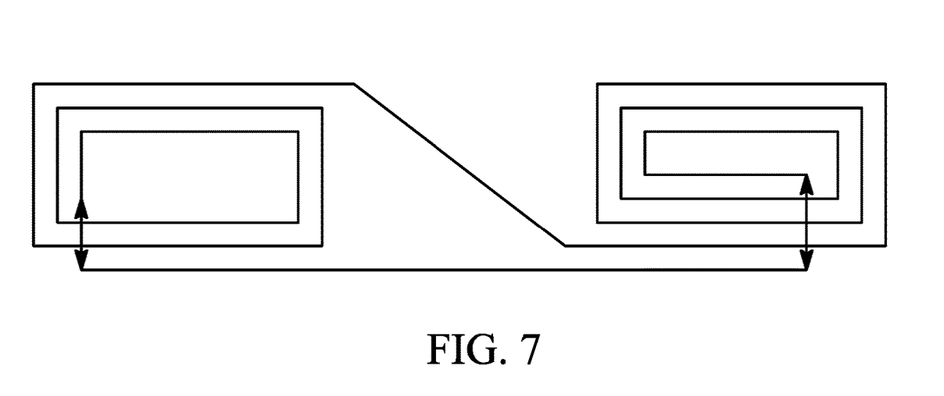
FIG. 7 is a diagram illustrating a printed antenna loop or pattern 700 for use as a printed antenna in the system 100 in accordance with one or more embodiments.

FIG. 7 is a diagram illustrating a printed antenna loop or pattern 700,110 for use as a printed antenna in the system 100 in accordance with one or more embodiments.

Figure 8:
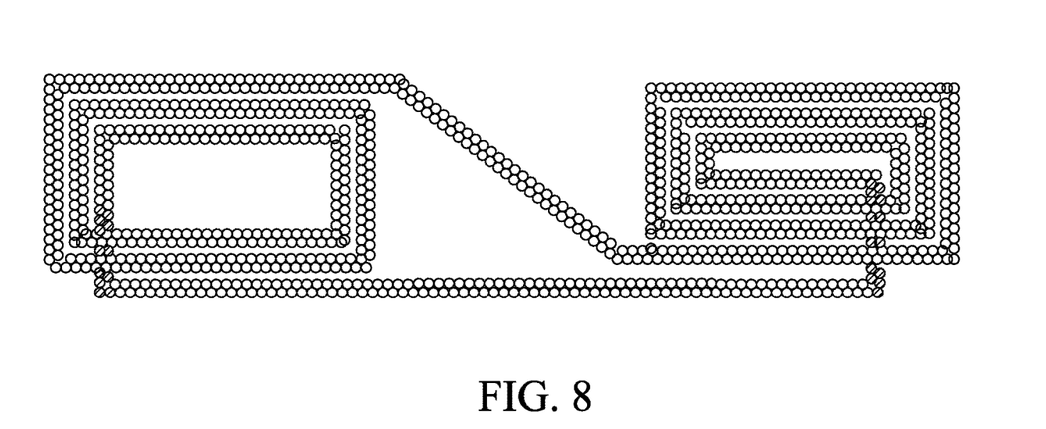
FIG. 8 is a diagram illustrating a printed antenna loop or pattern 800 for use as a printed antenna in the system 100 in accordance with one or more embodiments.

FIG. 8 is a diagram illustrating a printed antenna loop or pattern 800,110 for use as a printed antenna in the system 100 in accordance with one or more embodiments.

One general aspect includes a system for monitoring conveyor belts. The system also includes a printed inductive antenna loop incorporated within a conveyor belt. The system also includes a transmitter proximate the printed inductive antenna loop and configured to generate an electromagnetic field. The system also includes a detector configured to measure an induced electric field from the printed inductive antenna loop. The system also includes circuitry configured to detect damage of the conveyor belt based on the measured induced electromagnetic field.

Implementations may include one or more of the following features. The printed inductive antenna loop may include a pattern. The pattern may include a repeating matrix shaped as a circle. The pattern may include repeating circles. The pattern may include an inner rectangle and/or an outer rectangle. The printed pattern is an inverted loop design. The system where the printed pattern can couple the transmitter and detector heads when they are aligned in the longitudinal direction as opposed to the transverse direction. The system where dimensions of the printed inductive antenna loop being used to generate the antenna pattern are based on a selected performance. The system where the printed inductive antenna loop is applied to both sides of a loop substrate to facilitate conductivity and coupling of the sensor loop. Implementations of the described techniques may include hardware, a method or process, or computer software on a computer-accessible medium.

One general aspect includes a system for monitoring conveyor belts. The system also includes a conveyor belt may include one or more layers of elastomeric material. The system also includes a plurality of printed inductive antenna loops inserted into the one or more layers. The system also includes a transmitter configured to generate an electromagnetic field toward the conveyor belt. The system also includes a detector configured to measure an induced electric field from the plurality of printed inductive antenna loop. The system also includes circuitry configured to detect damage of the conveyor belt based on the measured induced electric field.

Implementations may include one or more of the following features. The plurality of printed inductive antenna loops may include repeating circles. The system where a second of the plurality of printed inductive antenna loops may include a rectangle. The system where a first of the plurality of printed inductive antenna loops having first loops and a second of the plurality of printed inductive antenna loops having second loops larger than the first loops. The system where the plurality of printed antenna loops arranged across a width of the conveyor belt. Implementations of the described techniques may include hardware, a method or process, or computer software on a computer-accessible medium.

One general aspect includes a printed inductive loop sensor for a conveyor belt. The printed inductive loop sensor also includes a plurality of printed conductive lines arranged in a pattern. The printed inductive loop sensor also includes the pattern configured to generate an induced magnetic field for rip detection.

As used herein, the term "circuitry" may refer to, be part of, or include an Application Specific Integrated Circuit) ASIC(,an electronic circuit, a processor)shared, dedicated, or group), and/or memory)shared, dedicated, or group(that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an Application Specific Integrated Circuit, a Digital Signal Processor, a Field Programmable Gate Array, a Programmable Logic Controller, a Complex Programmable Logic Device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second", and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially-relative terms, such as "inner", "adjacent", "outer", "beneath", "below", "lower", "above", "upper", and the like, may be used herein for ease of description to describe one element or feature's relationship to another element(s) or feature(s) as illustrated in the figures. Spatially-relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially-relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for monitoring conveyor belts, the system comprising:
 a printed inductive antenna loop incorporated within a conveyor belt;
 a transmitter proximate the printed inductive antenna loop and configured to generate an electromagnetic field;
 a detector configured to measure an induced electric field from the printed inductive antenna loop;
 circuitry configured to detect damage of the conveyor belt based on the measured induced electromagnetic field;
 the printed inductive antenna loop comprises a pattern; and
 the pattern comprises repeating circles.

2. The system of claim 1, the pattern further comprises a repeating matrix shaped as a circle.

3. The system of claim 1, the pattern further comprising an inner rectangle and/or an outer rectangle.

4. The system of claim 1, dimensions of the printed inductive antenna loop being used to generate the antenna pattern are based on a selected performance.

5. The system of claim 1, where the pattern is an inverted loop design.

6. The system of claim 1, where the printed pattern couples the transmitter and detector heads.

7. The system of claim 1, wherein the printed inductive antenna loop comprises one or more redundant conductive paths.

8. The system of claim 1, wherein the printed inductive antenna loop comprises printed conductive ink formed on a substrate.

9. The system of claim 1, wherein the printed inductive antenna loop comprises one or more redundant conductive paths.

10. The system of claim 1, wherein the printed inductive antenna loop comprises printed conductive ink formed on a substrate.

11. A system for monitoring conveyor belts, the system comprising:
 a printed inductive antenna loop incorporated within a conveyor belt;
 a transmitter proximate the printed inductive antenna loop and configured to generate an electromagnetic field;
 a detector configured to measure an induced electric field from the printed inductive antenna loop; and
 circuitry configured to detect damage of the conveyor belt based on the measured induced electromagnetic field; and
 the printed inductive antenna loop has a pattern and is applied to both sides of a loop substrate to facilitate conductivity and coupling of the sensor loop.

12. A system for monitoring conveyor belts, the system comprising:
 a conveyor belt comprising one or more layers of elastomeric material;
 a plurality of printed inductive antenna loops inserted into the one or more layers;
 a transmitter configured to generate an electromagnetic field toward the conveyor belt;
 a detector configured to measure an induced electric field from the plurality of printed inductive antenna loop; and
 circuitry configured to detect damage of the conveyor belt based on the measured induced electric field; and
 one or more of the plurality of printed inductive antenna loops comprises repeating circles.

13. The system of claim 12, a second of the plurality of printed inductive antenna loops comprises a rectangle.

14. The system of claim 12, a first of the plurality of printed inductive antenna loops having first loops and a second of the plurality of printed inductive antenna loops having second loops larger than the first loops.

15. The system of claim 12, the plurality of printed antenna loops arranged across a width of the conveyor belt.

* * * * *